(12) United States Patent
Piwowarski et al.

(10) Patent No.: US 9,195,743 B2
(45) Date of Patent: Nov. 24, 2015

(54) SYSTEM AND METHOD FOR CREATING AND APPLYING PREDICTIVE USER CLICK MODELS TO PREDICT A TARGET PAGE ASSOCIATED WITH A SEARCH QUERY

(75) Inventors: Benjamin Piwowarski, Santiago (CL); Hugo Zaragoza, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 949 days.

(21) Appl. No.: 11/867,321

(22) Filed: Oct. 4, 2007

(65) Prior Publication Data
US 2009/0094196 A1    Apr. 9, 2009

(51) Int. Cl.
*G06F 17/30* (2006.01)

(52) U.S. Cl.
CPC .... *G06F 17/30864* (2013.01); *G06F 17/30873* (2013.01)

(58) Field of Classification Search
CPC combination set(s) only.
See application file for complete search history.

(56) References Cited

U.S. PATENT DOCUMENTS

| | | | |
|---|---|---|---|
| 7,062,475 B1 * | 6/2006 | Szabo et al. | 706/11 |
| 7,311,666 B2 * | 12/2007 | Stupp et al. | 600/300 |
| 2007/0156887 A1 * | 7/2007 | Wright et al. | 709/224 |
| 2008/0071740 A1 * | 3/2008 | Jhala et al. | 707/3 |

OTHER PUBLICATIONS

Ann Aula et al., "*Information Search and Re-access Strategies of Experienced Web Users*", Tampere Unit for Computer-Human Interaction, Dept. of Computer Sciences, University of Finland, pp. 583-592, ACM 2005.
Andrei Border, "*A taxonomy of web search*", SIGIR Forum, 36(2):3-10, 2002, 8 pgs.
Robert G. Capra III et al., "*Using Web Search Engines to Find and Refind Information*", Computer, 38(10):36-42, Oct. 2005.
Susan Dumais, et al., "*Stuff I've Seen: A System for Personal Information Retrieval and Re-Use*", SIGIR 2003, Jul. 28-Aug. 1, 2003, pp. 8.
Yoav Freund et al., "*An Efficient Boosting Algorithm for Combining Preferences*", Journal of Medicine Learning Research 4, 2003 pp. 933-969.
David Heckerman, "*A Tutorial on Learning with Bayesian Networks*", Technical Report, MSR-TR-95-06, Mar. 1995 (Revised Nov. 1996).
Linda Tauscher et al., "*How People revisit web pages: empirical findings and implications for the design of history systems*", International Journal of Human-Computer Studies, 1997, pp. 97-137.
Jaime Teevan, "*The Re: Search Engine Helping People Return to Information on the Web*", Massachusetts Institute of Technology, Proceedings of the 28th Annual ACM Conference on Research and Development in Information Retrieval, 4 pgs.
Jaime Teevan, et al., "*History Repeats Itself: Repeat Queries in Yahoo's Logs*", SIGIR, pp. 2, 2006.

(Continued)

*Primary Examiner* — Shyue Jiunn Hwa
(74) *Attorney, Agent, or Firm* — Brinks Gilson & Lione

(57) ABSTRACT

Systems and methods for predicting a target page associated with a search query are disclosed. Generally, a predictive user click model module defines a set of sessions and builds a model to predict whether a webpage is a target page associated with a search query based on a number of times, over the set of sessions, that a user as defined in the session clicks within the same session on a given webpage associated with a given search query versus a number of sessions in the set of sessions.

12 Claims, 6 Drawing Sheets

(56) References Cited

OTHER PUBLICATIONS

Jaime Teevan et al., *Information Re-Retrieval: Repeat Queries in Yahoo's Logs, SIGIR 2007*, Jul. 23-27, Amsterdam, The Netherlands, pp. 151-158, Copyright 2007 ACM.

Steve Wedig et al., "*A Large-Scale Analysis of Query Logs for Assessing Personalization Opportunities*", KDD '06, Aug. 20-23, 6 pgs.

Robert B. Schnabel et al., "*A Modular System of Algorithms for Unconstrained Minimizations*", ACM Transactions on Mathematical Software, vol. 11, No. 4, Dec. 1985, pp. 419-440.

* cited by examiner

SYSTEM AND METHOD FOR CREATING AND APPLYING PREDICTIVE USER CLICK MODELS TO PREDICT A TARGET PAGE ASSOCIATED WITH A SEARCH QUERY

BACKGROUND

An Internet user submits a search query to Internet search engines, such as Yahoo!, to quickly and accurately obtain information related to the search query. Several types of search queries have been reported and studied. For example, navigation search queries are search queries in which an Internet user is looking for a particular webpage, also known as a target page, associated with a particular entity, such as a person or company. Further, information queries are search queries in which an Internet user is looking for general information on a topic and is likely to look at many webpages before satisfied.

Internet search engines that provide search results associated with received search queries desire to quickly and accurately provide search results to users, especially in the case of navigation search queries where an Internet user is looking for a particular target page. By quickly providing Internet users with accurate search results, the Internet search engine provides the Internet user with a positive experience and may increase the potential that the Internet user may return to the same Internet search engine for subsequent searches.

DETAILED DESCRIPTION OF THE DRAWINGS

The present disclosure is directed to systems and methods for creating and applying predictive user click models to predict a target page associated with a search query. As discussed in more detail below, when a user submits a navigational search query to an Internet search engine, the Internet search engine may use predictive user click models to quickly and accurately navigate the user to a target page associated with the search query without performing repetitive and unnecessary search operations.

By quickly and accurately navigating the user to a target page associated with the search query, the Internet search engine provides the user with a positive experience and may increase the potential that the user may return to the Internet search engine to perform subsequent searches. Further, by navigating the user to the target page without performing repetitive and unnecessary search operations, the Internet search engine may conserve resources for other necessary search operations, such as performing searches in response to information search queries.

Figure 1:
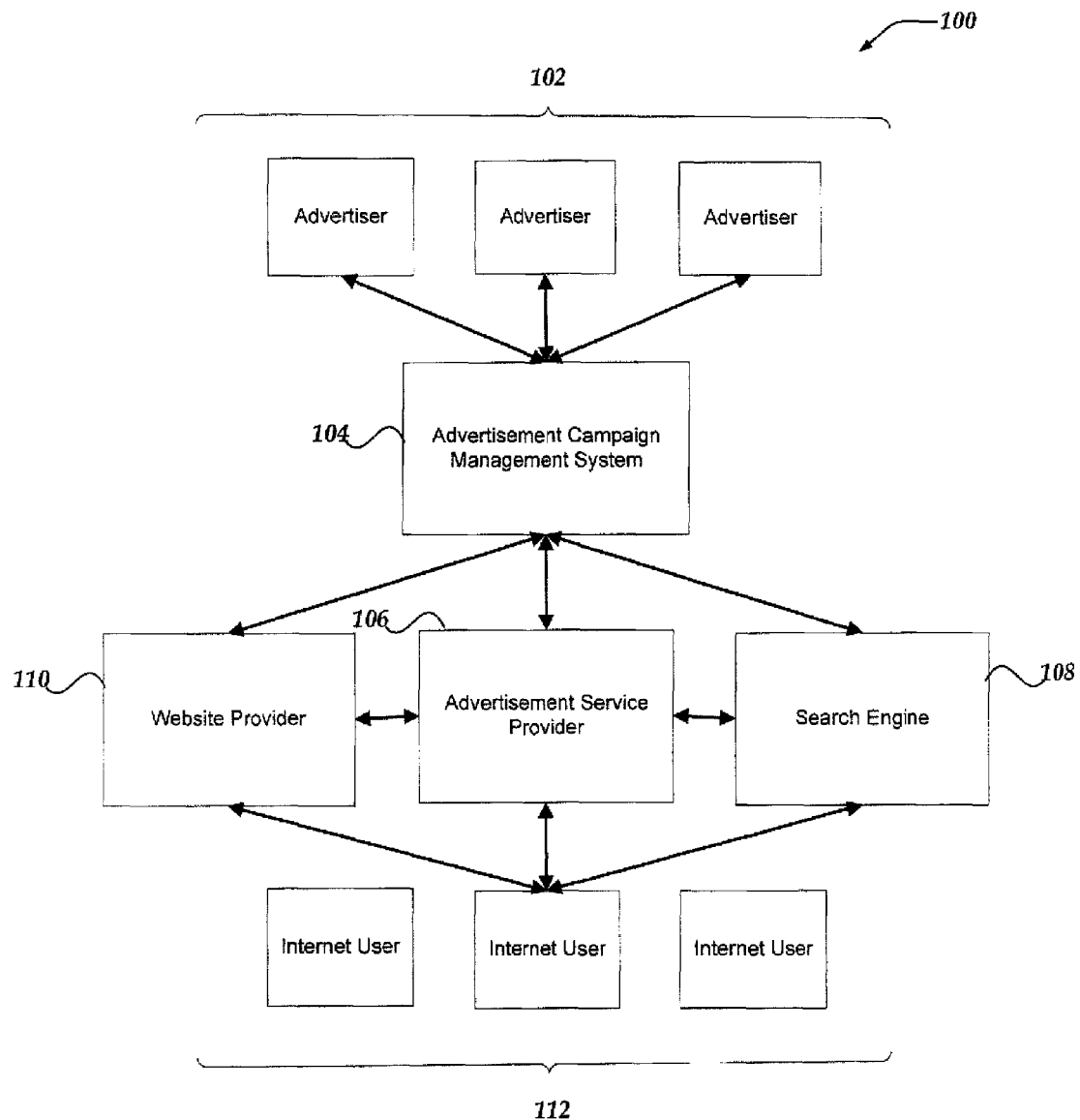
FIG. 1 is a block diagram of an environment in which a system for creating and applying predictive user click models to predict a target page associated with a search query may operate.

FIG. 1 is a block diagram of an environment in which a system for creating and applying predictive user click models to predict a target page associated with a search query may operate. For explanation purposes, the environment is described with a search engine for pay-for-placement online advertising. However, it should be appreciated that the systems and methods described below are not limited to use with a search engine or pay-for-placement online advertising.

The environment 100 may include a plurality of advertisers 102, an ad campaign management system 104, an ad provider 106, a search engine 108, a website provider 110, and a plurality of Internet users 112. Generally, an advertiser 102 bids on terms and creates one or more digital ads by interacting with the ad campaign management system 104 in communication with the ad provider 106. The advertisers 102 may purchase digital ads based on an auction model of buying ad space or a guaranteed delivery model by which an advertiser pays a minimum cost-per-thousand impressions (i.e., CPM) to display the digital ad. Typically, the advertisers 102 may pay additional premiums for certain targeting options, such as targeting by demographics, geography, technographics or context. The digital ad may be a graphical banner ad that appears on a website viewed by Internet users 112, a sponsored search listing that is served to an Internet user 112 in response to a search performed at a search engine, a video ad, a graphical banner ad based on a sponsored search listing, and/or any other type of online marketing media known in the art.

When an Internet user 112 performs a search at a search engine 108, the search engine 108 may return a plurality of search listings to the Internet user. The ad provider 106 may additionally serve one or more digital ads to the Internet user 112 based on search terms provided by the Internet user 112. In addition or alternatively, when an Internet user 112 views a website served by the website provider 110, the ad provider 106 may serve one or more digital ads to the Internet user 112 based on keywords obtained from the content of the website.

When the search listings and digital ads are served, the ad campaign management system 104, the ad provider 106, and/or the search engine 108 may record and process information associated with the served search listings and digital ads for purposes such as billing, reporting, or ad campaign optimization. For example, the ad campaign management system 104, ad provider 106, and/or search engine 108 may record the search terms that caused the search engine 108 to serve the search listings; the search terms that caused the ad provider 106 to serve the digital ads; whether the Internet user 112 clicked on a URL associated with one of the search listings or digital ads; what additional search listings or digital ads were served with each search listing or each digital ad; a rank of a search listing when the Internet user 112 clicked on the search listing; a rank or position of a digital ad when the Internet user 112 clicked on a digital ad; and/or whether the Internet user 112 clicked on a different search listing or digital ad when a digital ad, or a search listing, was served. One example of an ad campaign management system that may perform these types of actions is disclosed in U.S. patent application Ser. No. 11/413,514, filed Apr. 28, 2006, and assigned to Yahoo! Inc., the entirety of which is hereby incorporated by reference. It should be appreciated that the systems described below for creating predictive user click models to predict a target page associated with a search query may operate in the environment of FIG. 1.

Figure 2:
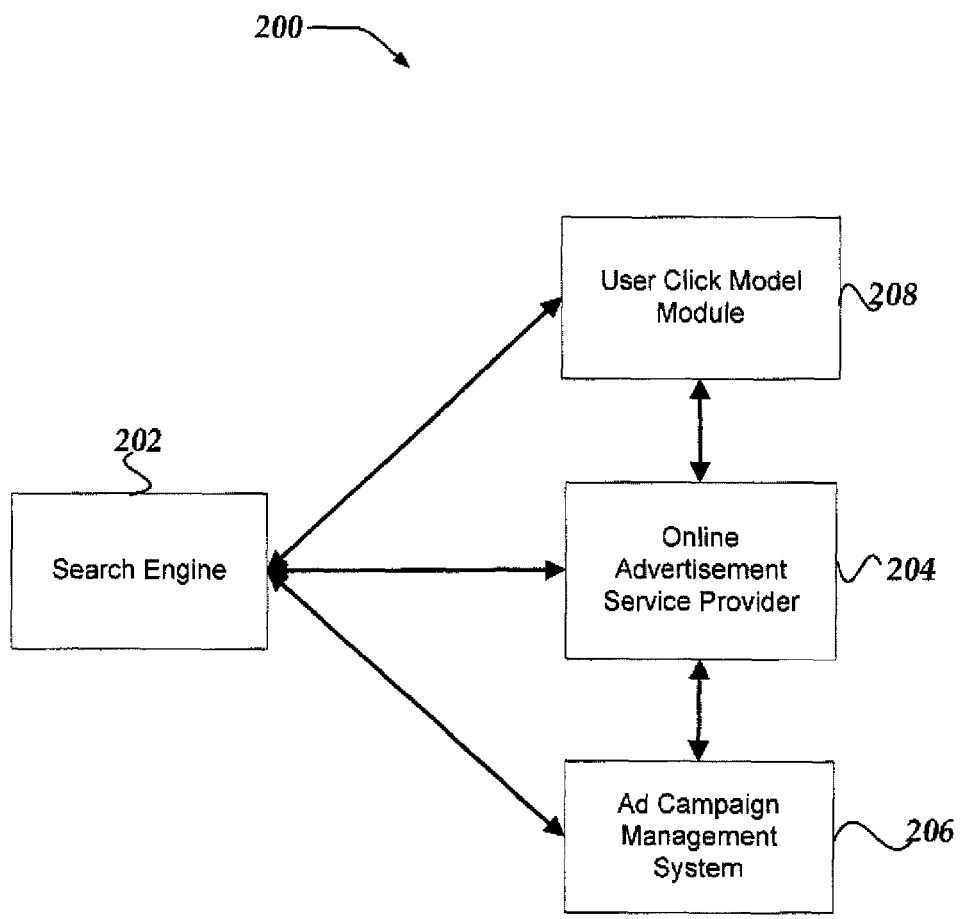
FIG. 2 is a block diagram of a system for creating and applying predictive user click models to predict a target page associated with a search query.

FIG. 2 is a block diagram of an embodiment of a system for creating and applying predictive user click models to predict a target page associated with a search query. Generally, the system 200 may include an Internet search engine 202, an ad provider 204, an ad campaign management system 206, and a user click model module 208.

In some implementations, the user click model module 208 may be part of the Internet search engine 202, the ad provider 204, and/or the ad campaign management system 206. However, in other implementations, the user click model module 208 is distinct from the Internet search engine 202, the ad provider 204, and/or the ad campaign management system 206.

The Internet search engine 202, ad provider 204, ad campaign management system 206, and user click model module 208 may communicate with each other over one or more external or internal networks. The networks may include local area networks (LAN), wide area networks (WAN), and the Internet, and may be implemented with wireless or wired communication mediums such as wireless fidelity (WiFi), Bluetooth, landlines, satellites, and/or cellular communications. Further, the search engine 202, ad provider 204, ad campaign management system 206, and user click model module 208 may be implemented as software code running in conjunction with a processor such as a single server, a plurality of servers, or any other type of computing device known in the art.

Generally, the Internet search engine 202 receives a search query from an Internet user interacting with the Internet search engine 202. In response to the search query, the Internet search engine 202 serves one or more search listings and the ad provider 204 may serve one or more digital ads. The Internet search engine 202, ad provider 204, and/or ad campaign management system 208 monitor actions of the Internet user receiving the search listings and digital ads to detect user navigation events associated with at least one of the served search listings or digital ads. Examples of user navigation events includes click-throughs ("clicks") on a search listing or a digital ad, activation of a media advertisement, and scrolling over a digital ad. In one implementation, the Internet search engine 202, ad provider 204, and/or ad campaign management system 208 may record associations between served search listings and/or digital ads and user navigation events, also known as click histories, in search logs. However, in other implementations the click histories are not stored in search logs.

The user click model module 208 examines the recorded click histories to build a model to predict a user target page associated with a received search query, and a degree of confidence associated with the predicted user target page. In one implementation the user click model module 208 builds a model based on a number of times, over a set of sessions, that a user clicks within the same session on a given URL associated with a given search query versus a number of sessions in the set of session.

In one implementation, the user click module 208 may build the model based on single clicks only, where in other implementations, the user click module 208 may build the model based on all clicks. A single click occurs when a user submits a search query and only clicks on one of the received search listings and digital ads. For example, when a user receives a plurality of search listings and digital ads, a single click occurs when the user clicks on a single search listing and does not return to the search results to view another of the search listings or digital ads. When a single click occurs, while it is possible that a user may have given up their search after clicking on only one of the received search listings and digital ads, typically, a user clicking on only one of the received search listings and digital ads is a strong indication of user satisfaction with the search listing or digital ad that the user clicked on. Conversely, when a user clicks on several search listings or digital ads after submitting a search query, it is not a strong indication of user satisfaction with the search listings or digital ads that the user has clicked on.

Generally, a session is a set of events related to a search query, where each event is associated with the same user, each event is associated with the same search query, and a period of time between two sequential events of the set of events is less than a predefined threshold. The user click model module 208 may define a set of sessions based on factors such as a number of users associated with received search queries, a period of time when search queries are received, a geographic location where users associated with received search queries are located, and a demographic of users associated with received search queries. For example, the user click model module 208 may define a set of sessions as a series of search queries received from a single user or a series of search queries received from multiple users. Further, the user click module 208 may define a set of sessions as series of search queries received from a user during a morning time period, an afternoon time period, a day, a week, a month, or any other time period desired by the click model module 208. Additionally, the user click module 208 may define a set of sessions as a series of search queries received from users located in a city, a state, a designated market area ("DMA"), a country, or any other defined geographic location desired by the user click model module 208. Moreover, the user click module 208 may define a set of sessions as series of search queries received from users of the same age, sex, income level, or spoken language.

Depending on how the user click model module 208 has defined a set of sessions, the user click model module 208 may create a model that is personalized for a specific user, a model that is directed to a defined group of users associated with one or more specific properties, or a model that is directed to all users. For example, the user click model module 208 may create a model directed to a group of users associated with a similar demographic, located in a specific area, at a specific time of the day.

In one implementation, for a defined set of sessions, the user click model module 208 builds a model to predict a target page associated with a search query based on the equation:

$$P = \frac{a + |S_d|}{a + b + |S|},$$

where P is a probability that a URL is a target page associated with a search query, $S_d$ is a number of times a user submits a given search query and clicks on a given URL over the set of sessions, S is the total number of sessions in the set of sessions, and a and b are priori parameters used to balance the equation towards a predetermined value until the values of $S_d$ and S become large. It should be appreciated that apriori parameters a and b have an effect on the model adaptation: The larger a+b is, the greater the number of sessions |S| need to be to significantly change the probability P.

After building the model, the user click model module 208 is able to predict whether a URL is a target page associated with a search query received at an Internet search engine 202, and determine a confidence score associated with the prediction.

Below is a more detailed discussion of one implementation to create predictive user click models. Click histories may be recorded over a period of time where each query session is defined as s:=(u, q, t, D), the tuple denoting a user u, a query q, a time t, and a sequence of clicked documents $D:=(d_{1_{-}}, \ldots, d_{|D|})$. For a given session s, the variables $q_s$, $u_s$, denote the different elements in s such as the query and the user. The sets of users, sessions and queries are denoted as U, S and Q. The term $S_u$ denotes the set of all the sessions by the user u, and $S_{uq}$ denotes the subset of these with the same query q. The user click model module counts the different clicks issued by users on specific documents and queries.

The basic counts from which the remaining values are derived are called click counts, and may be defined as:

$$Vuqd := |\{d \in D_s | s \in Suq\}|.$$

To simplify notation, the dependency of the different quantities with respect to the time t have been removed. It will be implicit for the remaining of the detailed example that any computation or prediction made at time t can be made using sessions that occurred in the past $\{s|ts<t\}$.

Click counts may be calculated in multiple alternative ways. For example, a user click model module may count all clicks or single clicks. All clicks are straightforward counts over the click-through data. With respect to single clicks, a user click model module eliminates all the sessions for which a user clicked more than once (i.e. |D|>1). Clicking on a single document may be a stronger indication of user satisfaction than clicking on several documents. While it is possible that after observing a single document a user abandoned a search altogether or used a new search query, if the user did not click on any other documents, the user was likely satisfied with the first document.

The objective of the user click model module is to define models which makes predictions of clicks to predict a target page associated with a search query. One point to begin this process is from the point of a Bernoulli process: a sequence of binary events. After a user u issues a query q, it is assumed that the user is presented with a single document d. This event, noted $\psi_{uqd}$, has two possible outcomes: the user either clicks on the document ($\psi_{uqd}=1$) or not ($\psi_{uqd}=0$). This process is repeated many times. The user click model module builds different estimators of $Pr(\psi_{uqd}=1)$ using different assumptions.

A prediction $\psi_{uq} \in \{W, \phi\}$ is a choice of a document for a given user and query at a given time. To allow a user click model module to be conservative, null predictions ($\phi$) are permitted, particularly for cases where there is not enough confidence in any particular prediction. A prediction model may follow the two steps:

$$d_{uq}^* = \arg\max_d \{Pr(\psi_{uqd} = 1)\}$$

$$Y_{uq} = \begin{cases} d_{uq}^* & \text{if } Xqud\_r \\ f & \text{otherwise} \end{cases}.$$

where $X_{qud}$ is a measure of confidence in prediction d*. Different estimators of $Pr(\psi_{uqd}=1)$ and of X may lead to different predictions.

There may be various ways to deal with equality, i.e. when there is more than one document with same value of $Pr(\psi_{uqd}=1)$. One solution is to select one document randomly, or to make a null prediction since there is no preference and one click sessions are being targeted. In the detailed example below, when there is one document with the same value of $Pr(\psi_{uqd}=1)$, a null prediction is made to avoid the introduction of randomness, thereby controlling the confidence of the model.

To measure performances, the user click model module uses a precision-recall metric. In order to measure different aspects of a prediction, the user click model module computes the expectation over the users and queries. Doing so allows the user click model module to give, for example, an equal importance to each user or, in the opposite, an importance proportional to the number of times the user asked a query. A prediction is considered to be correct if the predicted target page for session s (noted $\psi$s) was clicked by the user in that session (that is, if $\psi s \in Ds$).

$$recall = E\left(\frac{|\text{predicted sessions}|}{|\text{sessions}|}\right)$$

$$= \sum_u \sum_{q \in Q_u} \frac{|\{s \in S_{uq} | \Psi s \neq \phi\}|}{|S_{uq}|} Pr(q|u) Pr(u)$$

$$precision = E(PM)$$

$$= \sum_u \sum_q PM(u, q) Pr(q|u) Pr(u)$$

where:

Ψs is the prediction made for session s.

PM(u, q) is the percentage of good predictions for a given query and a given user.

Pr(u) is the probability of a user, which can be set to $$\frac{1}{|U|}$$

where |U| is the number of users (uniform probability, equal importance to every user) or $$\frac{|S_u|}{|S|}$$

(importance proportional to the number of sessions)

Likewise, Pr(q|u) can be $$\frac{|S_{uq}|}{|S_u|}$$

(importance relative to query frequency) for a query the user asked, and 0 otherwise. Other probabilities like $$\frac{|1|}{|Q|}$$

(uniform probability) are not adapted since the performance measure is not defined for queries the user did not ask.

The user click model module may use many of these combinations without changing the relative benefit of the models. However, the discussion below may refer to the simplest combination where each session has the same weight:

$$Pr(u) \times Pr(q \mid u) = \frac{|S_u|}{|S|} \times \frac{|S_{uq}|}{|S_u|} = \frac{|S_{uq}|}{|S|}$$

Figure 3A:
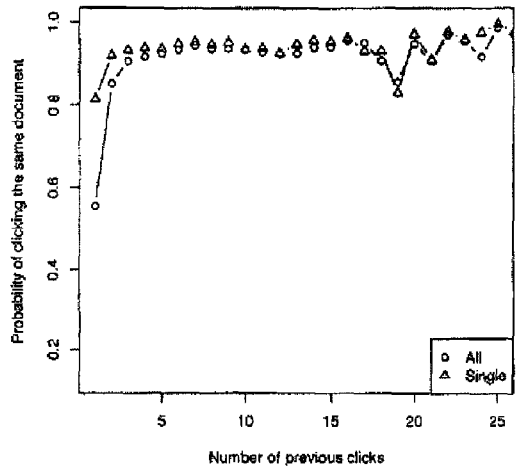
FIG. 3a is a diagram illustrating a probability that a user may click on a document after a query as a function of a number of times the user has already clicked on the same document after submitting the same query in the past.
Figure 3B:
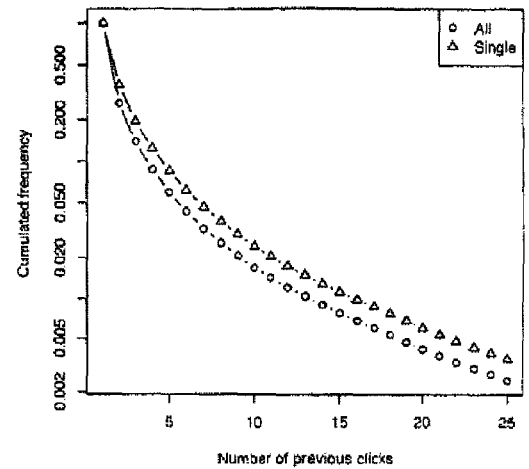
FIG. 3b is a diagram illustrating a histogram of a number of previous clicks on a document for every user click.

FIG. 3a shows the probability that a user may click on a document after a query as a function of the number of times the user has already clicked on the same document for the same query in the past. This may be equivalent to a model where $Pr(\psi_{uqd}=1) \propto V_{qud}$. If the user click model module counts all clicks, the probability is more than half for documents that have been clicked at least once, and grows quickly to over 0.95. The behavior is very similarly for single clicks, but the starting point is much higher (0.8 instead of 0.55), thereby confirming that single clicks are more informative. FIG. 3b shows the histogram of the number of previous clicks on that document for every user click.

The statistics in FIG. 3 provide a basis for a baseline model: predict the most clicked page if it has been clicked above a certain number of times. This can be done with the equation:

$$\Pr_B(\psi_{v\theta\delta}=1) = \frac{\varsigma_{\theta v\delta}}{\sum_{\delta'} \varsigma_{\theta v\delta'}}$$

$$X_{\text{quad}} = V_{qyd}$$

This model may be precise for queries that the user repeats often to refind pages. The model may be unprecise for queries that the user issues rarely, or queries for which the user is exploring for new information rather than refinding. Furthermore, the model may not be defined for any queries that the user has not previously typed. This type of model may be defined as a user-centric model because the model depends on the document, the query and the user.

The performance of this estimator can be estimated directly from FIG. 3. For example, if the user click model module sets a threshold to p=3, the model would make a prediction for roughly 14% of the queries a user types, and the model would be correct roughly 95% of the time it is used to make a prediction. Thus, this baseline can reach very high accuracy, but this may come at the price of being very conservative.

It may be desirable to improve over the baseline models proposed above in a number of ways. First, it may be undesirable to have to choose a priori a value for the threshold p: this value should depend on the click distribution of each query. Very consistent queries should require little evidence, whereas noisy queries should require more. To take this into account the user click model module may use Bayesian estimators, which integrate naturally the notion of confidence in the absence of the infinite data. Second, it may be desirable to extend predictions of the model to queries that a user never submitted. To accomplish this, it is necessary to extend the notion of refinding.

It may be desirable to model the likelihood $Pr(\psi_{uqd}=1|L)$ considering our data as coming from a Bernoulli process of clicks and no clicks, where L is any available past information that can modify our knowledge on $\psi_{uqd}$. In the Bayesian framework this likelihood is the result of integrating all the possible Bernoulli models (that is over all possible values of the probability θ of success), weighted by their likelihood given past information L:

$$Pr(\psi_{uqd}|L) = \int_\theta p(\psi_{uqd}|\theta) p(\theta|L) \tag{1}$$

An advantage of using Bayesian estimators is that they may naturally be pulled towards their prior likelihood p(θ) in the absence of sufficient data. It should be appreciated that in frequentist (non Bayesian) statistics this can also be achieved by smoothing the estimators of frequency (maximum likelihood estimators) so they are robust to small data sets.

Choosing the prior likelihoods appropriately, the estimators may be naturally conservative in the absence of strong evidence. This may allow the estimators to trust their estimation directly, not only for prediction but also to determine a confidence of the predication. When using Bayesian estimators the following equation may be used:

$$X_{uqd} = Pr(\psi_{uqd}=1)$$

Using this equation, the user click model module can set p to some global fixed value (0.95 for example), and the user click model module may handle the implications of this automatically for every model.

A natural choice of prior for the Bernoulli is its conjugate prior, the beta distribution β(θ; a, b) with parameters a, b>0. These parameters correspond to pseudo-counts, or fictitious a priori observations of events, such as clicks on the document or on other documents respectively as in the described models. Their ratio $$\frac{a}{a+b}$$

determines the a priori likelihood of a click on the document, and the magnitude a+b determine the strength of the prior over the observations.

Without any information, i.e. when L is empty, the prior is governed by the a priori parameters a and b, and is given by:

$$p(\theta|L=\phi) = p(\theta) = \beta(\theta; a, b)$$

As more and more information is gathered, the user click model module updates the prior on θ. As the beta distribution is a conjugate prior of the Bernoulli process, the posterior distribution of the parameters when some data is available is a simple count of positive (clicks) and negative (non clicks) events in the Bernoulli process that the user click model module adds to the fictitious observations. Using the Bayes law, the posterior distribution of a beta distribution, knowing observations coming from a Bernoulli process, may be given by:

$$p(\theta|L) = \frac{Pr(L|\theta) * p(\theta)}{\int_\theta Pr(L|\theta) * p(\theta)} \tag{2}$$

This equation may be solved analytically:

$$p(\theta|L) = \beta(\theta; a+|S_d|, b+|S \setminus S_d|) \tag{3}$$

where S denotes the set of events considered, $S_d$ denotes the subset of positive events and $S \setminus S_d$ the subset of negative ones.

In the present case, S is the sessions considered in the model and S={s|d$_s$=d, s∈S} the subset of these which lead to a click on d.

Inserting Equation (2) into Equation (1), the resulting solution to Equation (1) analytically is:

$$Pr(\psi_{v\theta\varepsilon} | \Lambda) = \int_\theta \theta \beta(\theta; \alpha + |\sum_\varepsilon|, \beta + |\sum \setminus \sum_\varepsilon|) \quad (4)$$

$$= \frac{\alpha + |\sum_\varepsilon|}{\alpha + B + |\sum|} \quad (5)$$

There may be several choices to construct such sets. Two options for S and S$_d$, for constructing such sets are user-query models and global-query models. In the first case the user click model module builds a model for each query q of each user u independently, using only data corning for that user. In the second model, the user click model module mixes all the users together into one group:

user centric model: $Pr_u(\psi_{uqd}=1)$ is obtained from Equation (4) using S=S$_{qu}$:={s|u$_s$+u, q$_s$=q}.

global model: $Pr_g(\psi_{uqd}=1)$ is obtained from Equation (4) using S=S$_q$:={s|q$_s$=q}.

In order to fix the values of the hyperparameters a and b, the user click model module may user a standard optimisation technique. In one implementation, values for a and b may be 1 and 0.3 for the user-centric model, and value for a and b may be 29.7 and 6.8 for the global model. In both cases, there is a favorable a priori on the document. This may be expected since the parameters are computed for documents in the set of those already clicked by the user(s). Note also that the a priori parameters for the global model are much higher than those of the user model. This implies that the user centric model may be much more influenced by new observations.

Using the methods described above for confidently predicting a document for a user query pair, the user click model module can use this information to build groups of related users, i.e. users that would click on the same document for the same query. For each document and query the user click model module defines its user group G$_{qd}$ to be that set of users that have predicted the document as being the best for the query:

$$G_{qd} = \{u | \psi_{uq} = d\}$$

This definition may be deterministic at each time t, since predictions are deterministic. Click counts for a group can be defined as follows:

$$V_{gqd} := \sum_{u \in G_{gd}} V_{uqd} \quad (6)$$

These clicks may take only into account the users that are highly related to a group of users who click on d for query q with a high confidence. In other words, it may ignore clicks from users who do not prefer the document d clicked. With these counts a third type of predictive model may be defined as:

group model $P_{qqd*}(\psi_{uqd}=1)$ is obtained by multiplying the probability $Pr(G_{qd*}|u)$ that the user belongs to the group with Equation (4) using the same S$_q$ as for the global model but using the counts from Equation (6).

Computing the probability $P(G_{qd}|u)$ can be done in a number of ways. For the example below, it may be assumed that the user belongs to the group unless there is a very low probability that the user may not click on the document d, or equivalently if there is some support to the fact that the user may click on document d link. The probability that the user belongs to the group may be defined formally as:

$$Pr(G_{qd}|u) = Pr[\beta(\theta; a+|S_d|, b+|S \setminus S_d|) \geq p']$$

The threshold was set empirically to the value 0.9 using the development set.

The interest of group models is that they pool clicks from similar users, allowing the confidence to grow much faster. If a user clicks on a document once, and there are many similar users who also clicked on the document, the document is likely the target.

Each one of the three models defined above has different characteristics. For example, global models can be very accurate for popular navigational queries whereas user models can be very accurate for user specific refind queries. Since the models seem complementary, some implementations may include combining the three models into a single model.

Figure 4:
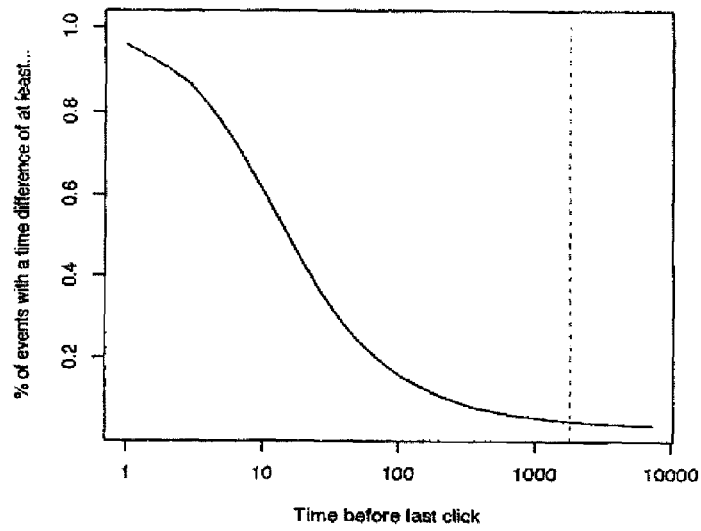
FIG. 4 is a diagram illustrating a percentage of query related events—such as typing a query, clicking on a search result—within a given time frame.

The following is a discussion of user centric, community, and global models. FIG. 4 is a diagram illustrating a percentage of events within a given time frame. The data of FIG. 4 has been plotting using click histories from search logs from a commercial Internet search engine over a period of 57 days. In order to associate users with queries, users have been eliminated form the log for which a unique ID was not present (e.g., users not logged into the search engine).

In order to establish user sessions a user click model module may use a timeout of thirty minutes: every click related to the same query and user within thirty minutes was considered to be within the same session.

As shown in FIG. 4, the threshold data may be verified by plotting the distributions of time differences between two consecutive clicks of the same user for the same query (for all users and clicks in the 57 days). It can be seen that the clicks decrease exponentially between 10 and 100.

Figure 5A:
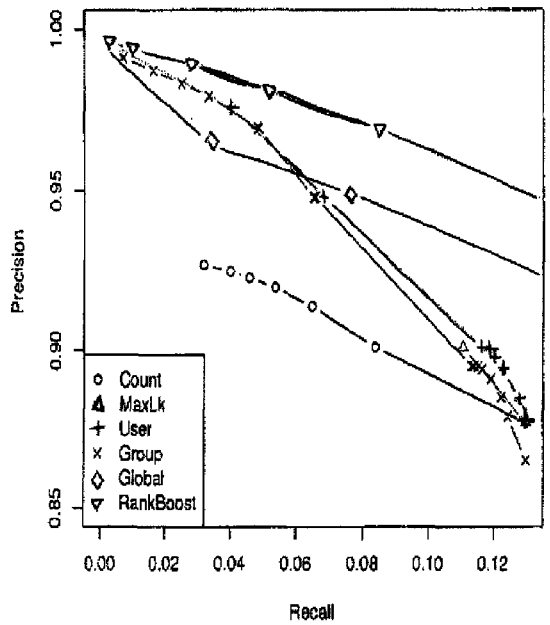
FIGS. 5a and 5b are diagrams illustrating a precision of different models with respect to a recall measure.
Figure 5B:
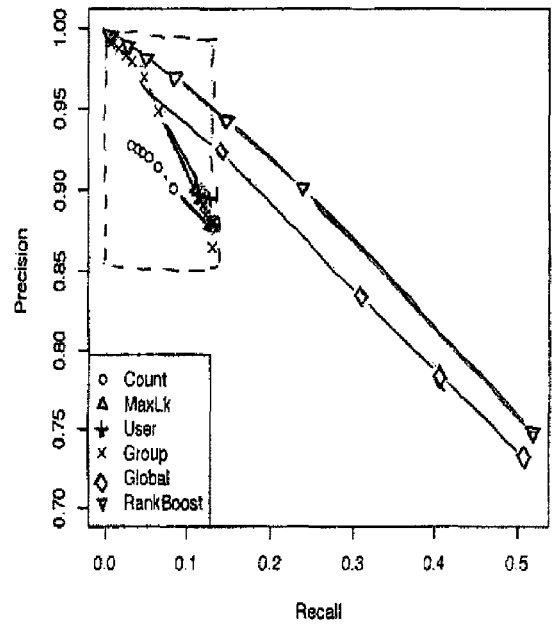

FIGS. 5a and 5b illustrate the precision of different models with respect to the recall measure described before for all click counts. The curves were obtained by using different threshold values on X$_{qud}$. Note that user centric methods are not shown to predict beyond 13% of recall, whereas global methods may reach 50% recall.

As shown, the baseline method (Count) performs worse than the other methods in general, but nevertheless it has some predictive power: for 1% of sessions they can predict the target page with 90% accuracy. The maximum likelihood (ML) method performs similarly to the count method, but is not able to distinguish the cases where there was only a few—one or two—sessions from the cases where there are more. Consequently, this model may not be able to reach high precision values for lower recall values. Probabilistic models may be better than the baseline for very low recall regions: they may build confidence faster than the counting method. However they are similar to the baseline for high recall levels (beyond 10%).

Global methods reach much higher recall values, but the global methods seem almost as accurate at the low recall (high rejection) end. The probabilistic global model may outperform the baseline for all values of recall. It may also outperform the probabilistic user-centric models for all recalls beyond 0.06.

Finally, methods may successfully combine the different methods described above for to produce a model that outperforms all others for all ranges of recall. Furthermore, the combination model is almost 5% better than the global one consistently for all values of recall.

These results may mean that it is possible to predict the target page of a user 50% of the time with an accuracy of 75%, or alternatively 5% of the time with an accuracy of 98%. Such high accuracy can open up the way to new forms of search interfaces that may proactively highlight or open the predicted target pages.

Figure 6:
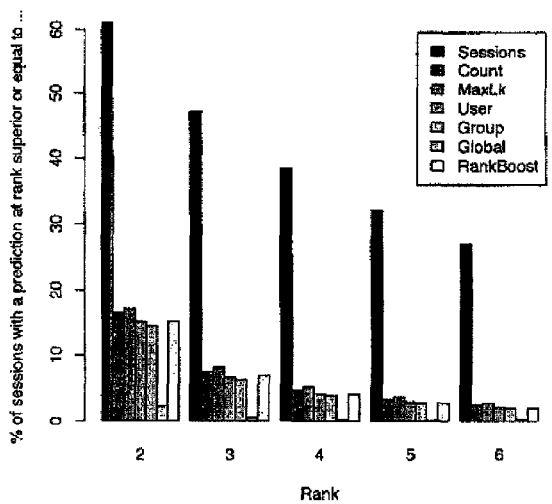
FIG. 6 is a diagram illustrating a percentage of predictions made and a percentage of clicks given a rank.

With respect to how many pages predicted by a model to be a target page were already ranked 1 by the search engine without any history information, to some degree, predicting correctly a click on rank 6 is more useful to the user than predicting correctly a click one at rank 1. FIG. 6 illustrates a percentage of predictions made and a percentage of clicks given a rank. For example, 9% of the good predictions were documents at a rank superior or equal to rank 2. This should be compared with the click behavior of users, who click at rank 2 or more 60% of the time.

It should be appreciated that the more specific a strategy, the higher the ranks of the predicted documents, and therefore the more useful the prediction may be to a user. However, even if all of the prediction were at rank 1, the models would still be very useful because they do not only pick a document, they also decide when to predict and when not to. This confidence feature is useful to design search interfaces that do not solely rank documents; for example, for a system to perform actions such as highlighting the predicted document or opening the predicted document directly on a browser window.

Figure 7:
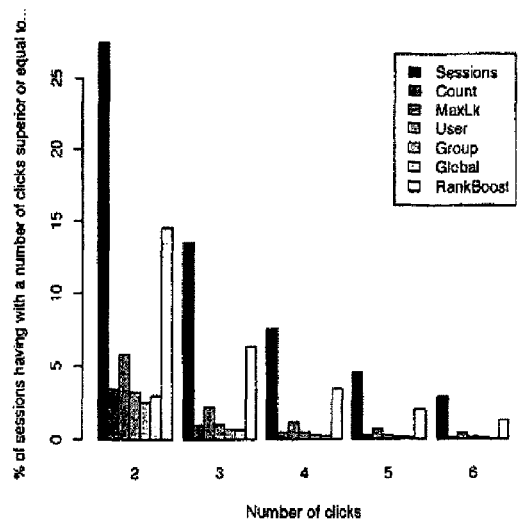
FIG. 7 is a diagram illustrating a distribution of a number of clicks per session for the different models.

FIG. 7 illustrates a distribution of a number of clicks per session for the different models. This Figure illustrates a relationship between single click and all click ways of computing the counts. It should be appreciated that all models predict mostly one click queries (more than 80% of the cases). The combination of models method makes more predictions for multiple click sessions. It shows that combining information from the different models can be very advantageous, since it provides the ability to predict clicks in multiple clicks sessions.

Figure 8:
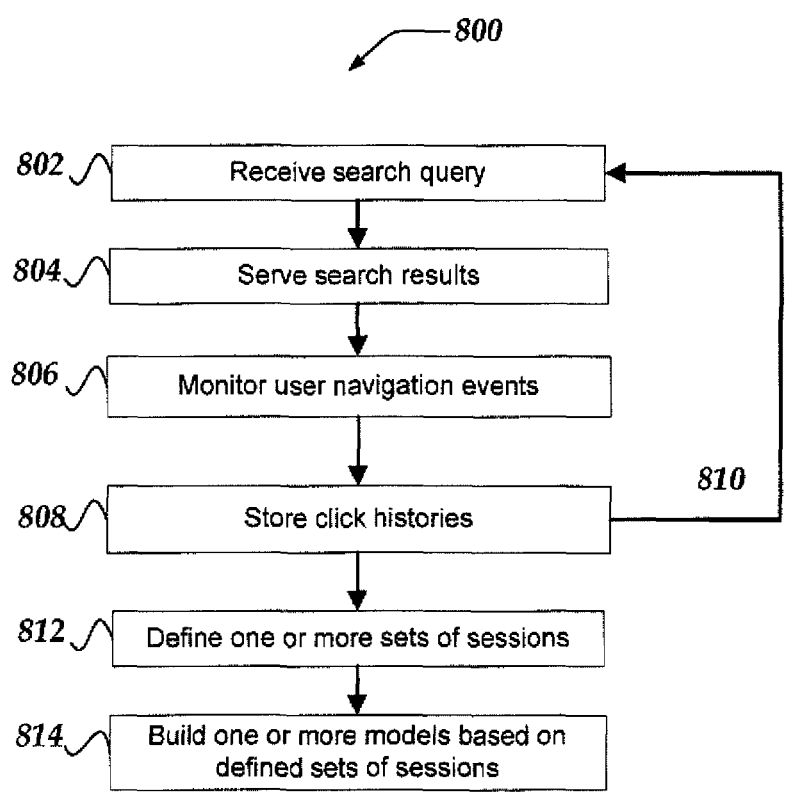
FIG. 8 is a flow chart of a method for creating predictive user click models to predict a target page associated with a search query.

FIG. 8 is a flow chart of an embodiment of a method for creating predictive user click models to predict a target page associated with a search query. The method begins at step 802 with an Internet search engine receiving a search query. At step 804, the Internet search engine and/or an ad provider serve a set of search results to the Internet user submitting the search query. The search results may include search listings, digital ads, or any other type of information typically provided with search results. At step 806, the Internet search engine, ad provider and/or ad campaign management system monitors user navigation events associated with the served search results and at step 808, the Internet search engine, ad provider and/or ad campaign management system store a click history including information regarding the served search results and monitored user navigation events. In one implementation the search histories may be stored in a search log. It should be appreciated that steps 802, 804, 806, and 808, described above, are repeated a plurality of times (loop 810) to create a plurality of click histories.

At step 812, the user click model module defines a set of sessions to create a model. As described above, the user click model module may define a set of sessions based on parameters such as a specific user, users associated with a common demographic, or a time of day when a search query is received.

At step 814, the user click model module examines at least a portion of the plurality of click histories associated with a set of sessions as defined in step 812 to build a model used to predict whether a URL is a target page associated with a search query based on a calculated probability, also known as a confidence score. As described above, in one implementation, the user click model module builds the model based on a number of times, over a set of sessions, that a user clicks on a given URL after submitting a given search query versus a number of sessions in the set of sessions.

While the method described with respect to FIG. 8 teaches a user click model module creating a single model to predict a target page associated with a received search query, it should be appreciated that in other implementations, one or more click model modules may create multiple models to predict a target page associated with a received search query.

For example, at step 812, the user click model module may define two or more different sets of sessions based on different types of events, such as a first set of sessions, a second set of sessions and a third set of sessions. Then at step 814, the user click model module may build multiple models, each model build based on a different set of sessions defined at step 812. Continuing with the example above, the user click model module builds a first model based on the first set of sessions, a second model based on the second set of sessions, and a third model based on the third set of sessions. As explained in more detail below, the Internet engine may then use the first, second, and third models to predict a most likely target page associated with a received search query.

Figure 9:
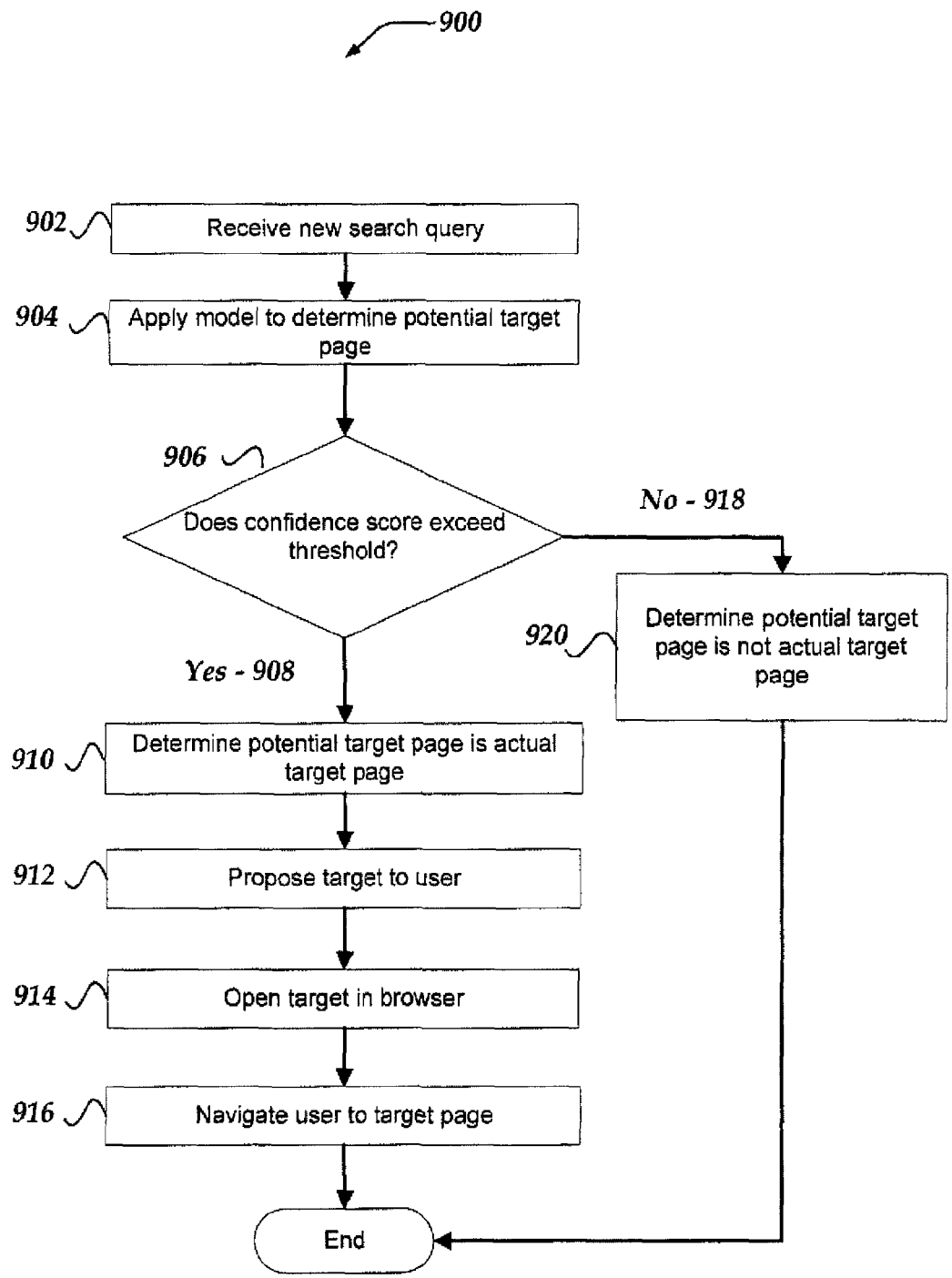
FIG. 9 is a flow chart of a method for applying predictive user click models to predict a target page associated with a search query.

FIG. 9 is a flow chart of an embodiment of a method for applying predictive user click models to predict a target page associated with a search query. The method begins at step 902 with an Internet search engine receiving a search query. At step 904, the Internet search engine, ad provider, ad campaign management system, and/or user click model module applies a model created using the method described with respect to FIG. 8 to each potential target page of a set of potential target pages to calculate a probability that each potential target page is the actual target page associated with the received search query.

In one implementation, to predict a target page associated with the received search query, the Internet search engine, ad provider, ad campaign management system, and/or user click model module applies the model to a set of potential target pages without the Internet search engine first performing a search based on the received search query. In this implementation, the set of potential target pages are derived from a search history for the received query. More precisely, potential target pages are pages that Internet users have previously clicked on for the received query. By predicting a target page without the Internet search engine first performing a search, the user may be quickly and accurately navigated to a target page while alleviating the Internet search engine from performing many repetitive and unnecessary operations for navigational searches.

In other implementations, the set of potential target pages may be a set of search listings returned from the Internet search engine that are associated with the received search query. In this implementation, the model is applied to the search results to predict which of the search results is the likely the target page associated with the search query. By applying the model to the search results, the Internet search engine improves the likelihood of serving relevant search results in response to the received search query.

Applying the model to a set of potential target pages at step 904 results in for each target page of the set of potential target pages, a probability, also known as a confidence score, that that the potential target page is the actual target page associated with the search query. In some implementations, the Internet search engine may compare the highest probability associated with a potential target page to a threshold at step 906. If the probability that the potential target page is the actual target page exceeds the threshold (branch 908), the Internet search engine determines the potential target page is likely the actual target page associated with the search query at step 910. The Internet search engine may additionally perform actions such as proposing to a user the most likely target page associated with the received search query at step 912, opening the predicted target page in a portion of a browser with served search results associated with the received search query at step 914, and navigating the user to the predicted target page when the user click model indicates the user may not click on any other search listing or digital ad associated with a search query at step 916.

Conversely, if the probability that the potential target page is the actual target page does not exceed the threshold (branch 918), the Internet search engine determines the potential target page is likely not the actual target page at step 920 and the method ends.

While the method described with respect to FIG. 9 teaches an Internet search engine using a single model to predict a target page associated with a received search query, as discussed in conjunction with FIG. 8, it should be appreciated that other implementations may utilize multiple models to predict a target page associated with a received search query. Continuing with the example above with first, second, and third models, when an Internet search engine receives a search query at step 902, the Internet search engine applies each of the first, second, and third models at step 904 to predict a target page associated with the received search query. For example, applying the three models may result in a first target page determined using the first model, a second target page determined using the second model, and a third target page using the third model.

The Internet search engine then compares the determined target pages with each other to determine an actual target page associated with the new received search query. Continuing with the example above, the Internet search engine compares the first target page, the second target page, and the third target page to determine an actual target page associated with the search query.

FIGS. 1-9 teach systems and methods for creating predictive user click models to predict a target page associated with a search query. Through the use of predictive user click models, Internet search engines may quickly and accurately navigate a searcher to an intended target page without performing repetitive and unnecessary search operations. Further, when the predictive user click models are applied to search results created by an Internet search engine, the user click models provide the ability for the Internet search engine to provide more accurate search results.

Using the results of the predictive user click models, an Internet search engine may perform actions such as proposing to the user the most likely target page associated with a received search query, opening a predicted target page in a portion of a browser with served search results, or navigating a user directed to a predicted target page when the user click model indicates a user may not click on any other search listing or digital ad associated with a search query.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for predicting a target page associated with a search query, the method comprising the steps of:
receiving, by a processor, a search query from a user over a network;
defining, by a processor, a set of sessions, wherein the set of sessions is a predefined series of search queries received from a predefined group of users within a predefined period of time;
for each of a first plurality of candidate webpages associated with the search query, determining, by a processor, a probability score that the candidate webpage is a target page associated with the search query over the set of sessions, wherein the target page is a webpage that when being selected by the user from a search listing of webpages associated with the search query, the user does not return to the search listing to view another webpage in the search listing;
selecting, by a processor, a candidate webpage from the first plurality of webpages, of which the probability score is higher than a threshold value as a target page;
determining, by a processor, that the user will not click on any other search listing or digital ad associated with the search query, and
navigating, by a processor, a browser of a user to the determined target page.

2. The method of claim 1, further comprising:
opening the determined target page in a portion of a browser.

3. The method of claim 1, wherein the set of sessions is defined based on a demographic of a user submitting a search query.

4. The method of claim 1, wherein the set of sessions is defined based on when a search query is submitted.

5. The method of claim 1, wherein the set of sessions is defined based on a location from which a user submitting a search query is located.

6. The method of claim 1, wherein the set of sessions is defined based on single clicks.

7. The method of claim 1, wherein the set of sessions is defined based on multiple clicks.

8. The method of claim 1, further comprising:
defining, by a processor, a second set of sessions;
for each of a second plurality of candidate webpages associated with the search query, determining, by a processor, a probability that the candidate webpage is a target page associated with the search query over the second set of sessions;
determining that a candidate webpage of the second plurality of candidate webpages is a second target page associated with the received search query when the second probability is greater than a threshold;
determining, with a processor, an actual target page associated with the received search query based on the target page and second target pages; and
proposing the actual target page to the user.

9. A non-transitory computer-readable storage medium comprising a set of instructions for predicting a target page associated with a search query, the set of instructions to direct a processor to perform acts of:
receiving a search query from a user over a network;
defining a set of sessions, wherein the set of sessions is a predefined series of search queries received from a predefined group of users within a predefined period of time; and
for each of a first plurality of candidate webpages associated with the search query, determining a probability score that the candidate webpage is a target page associated with the search query over the set of sessions, wherein the target page is a webpage that when being selected by the user from a search listing of webpages associated with the search query, the user does not return to the search listing to view another webpage in the search listing;

selecting a candidate webpage from the first plurality of webpages, of which the probability score is higher than a threshold value as a target page; and determining that the user will not click on any other search listing or digital ad associated with the search query, and navigating a browser of a user to the determined target page.

10. The non-transitory computer-readable storage medium of claim 9, wherein the set of sessions is defined based on at least one of a demographic of a user submitting a search query, when a search query is submitted, a location from which a user submitting the search query is located, single clicks, or multiple clicks.

11. A system for predicting a target page associated with a search query, the system comprising: a processor and a memory, the processor configured to execute instructions stored in the memory such that the processor is configured to:

receive a search query from a user over a network;

define a set of sessions, wherein the set of sessions is a predefined series of search queries received from a predefined group of users within a predefined period of time; and for each of a first plurality of candidate webpages associated with the search query, determine a probability score that the candidate webpage is a target page associated with the search query over the set of sessions, wherein the target page is a webpage that when being selected by the user from a search listing of webpages associated with the search query, the user does not return to the search listing to view another webpage in the search listing;

select a candidate webpage from the first plurality of webpages, of which the probability score is higher than a threshold value as a target page; and determine that the user will not click on any other search listing or digital ad associated with the search query, and navigate a browser of a user to the determined target page.

12. The system of claim 11, wherein the set of sessions is defined based on at least one of a demographic of a user submitting a search query, when a search query is submitted, a location from which a user submitting the search query is located, single clicks, or multiple clicks.

\* \* \* \* \*